Oct. 4, 1949.  J. W. DAWSON  2,483,691
CONDENSER WELDING SYSTEM
Filed Jan. 6, 1940

INVENTOR.
JOHN W. DAWSON,
BY
ATTY.

Patented Oct. 4, 1949

2,483,691

UNITED STATES PATENT OFFICE 2,483,691

CONDENSER WELDING SYSTEM

John W. Dawson, Auburndale, Mass., assignor to Raytheon Manufacturing Company, Newton, Mass., a corporation of Delaware Application January 6, 1940, Serial No. 312,712

17 Claims. (Cl. 320—1)

This invention relates to condenser welding systems, and more particularly to those systems in which electrical energy is stored in the condenser and then discharged through a welding transformer to deliver welding current to a resistance welding load. In welding of this type it is often desirable to produce as great a number of welding operations per unit of time as possible. For this reason it is desirable to produce as rapid a rate of charging of the condenser between welds as is commensurate with the proper operation of the system.

An object of this invention is to devise a condenser welding system in which the permissible speed of welding operations is increased.

Another object is to devise means whereby the charging current to the condenser is automatically stopped when said condenser is charged to a predetermined voltage, and also to provide an adjustment of said predetermined voltage.

A further object is to increase the fineness of adjustment of the voltage to which the condenser may be charged.

Certain aspects of this invention have particular application to the arrangement as described and claimed in my copending application, Serial No. 309,124, filed December 14, 1939, for Condenser welding systems. As set forth in said application the condenser may be discharged so as to produce a substantially unidirectional welding current with an exponential decay. An object of the present invention is to provide an arrangement in which the charging of the condenser may restart even during the decay of said welding current.

The foregoing and other objects of this invention will be best understood from the following description of an exemplification of my invention, reference being had to the accompanying drawing, wherein.

Figure 1:
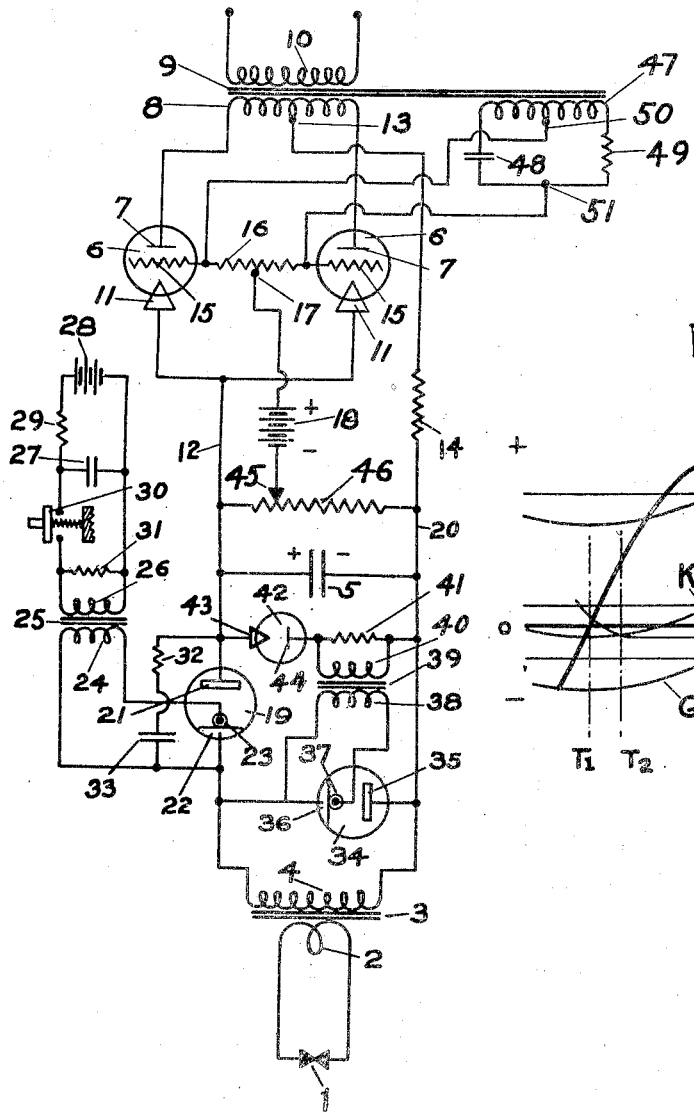
Fig. 1 is a diagram of a condenser welding system embodying my invention.

In Fig. 1 welding current is to be supplied to a welding load 1 from a secondary winding 2 of a welding transformer 3 having a primary winding 4 thereon. The magnetic core of this welding transformer preferably has a small air gap to take care of D. C. saturation. However, various arrangements for taking care of such D. C. saturation as described and claimed in my copending applications, Serial No. 312,019, filed January 2, 1940, Patent No. 2,294,388, September 1, 1942, and Serial No. 312,402, filed January 4, 1940, may be utilized herein. The primary winding 4 is adapted to be energized by the discharge of a relatively large condenser 5. This condenser is adapted to be charged from any suitable source of direct current, such as a direct current generator, battery, rectifier, or the like. In Fig. 1 the direct current is shown as being supplied from a pair of rectifier tubes 6 of the controlled ignition type. These tubes may be of the gas or vapor-filled type provided with a control member, such as a grid between the cathode and anode, the voltage on the grid determining whether or not a discharge will start through the tube when the anode becomes positive. The tubes 6 are provided with anodes 7 connected to the opposite sides of a secondary winding 8 of a charging transformer 9 whose primary winding 10 is adapted to be connected to a suitable source of alternating current. The tubes 6 may likewise be provided with cathodes 11 which may be of the permanently-energized type, such as, for example, thermionic filaments. The two cathodes are connected together through the connection 12 to the positive side of the condenser 5. The secondary winding 8 is provided with a center tap 13 which is connected through an impedance 14, preferably a resistance, to the negative side of the condenser 5.

The tubes 6 are provided with control grids 15 connected together through an impedance 16. This impedance may conveniently be a resistance. The impedance 16 is provided with a center tap 17 which is connected through a bias battery 18 to an adjustable tap 45 on a potentiometer 46 connected across the condenser 5. The potentiometer 46 serves as a divider of the voltage across the condenser 5, and by adjustment of the tap 45, any desired portion of this voltage may be selected. Superimposed across the impedance 16 is a phase-shifted alternating voltage from a phase-shift circuit. This phase-shift circuit consists of an auxiliary winding 47 on the transformer 9 across which is connected a condenser 48 in series with a resistance 49. The secondary winding 47 is provided with a center tap 50 connected to one side of the impedance 16. The other side of said impedance 16 is connected to a point 51 intermediate the condenser 48 and resistance 49. In this way an alternating voltage shifted in phase from the alternating voltage appearing across the secondary winding 8 is impressed across the impedance 16. Preferably the phase shift is of the order of 90 degrees.

The positive side of the condenser 5 is connected through a controlled ignition discharge tube 19 to the left end of the primary winding 4. The tube 19 is preferably of the pool cathode type with an igniter for initiating a cathode spot on the pool in order to conduct current. Although any suitable type of igniter may be used, it preferably is of the type described and claimed in the copending application of Percy L. Spencer, Serial No. 303,963, filed November 13, 1939, Patent No. 2,290,897, July 28, 1942, for an improvement in Arc igniting devices, consisting of a conductor separated and insulated from the cathode by a thin glass layer. The negative side of the condenser 5 is connected through a connection 20 to the right end of the primary winding 4. The tube 19 is provided with an anode 21 connected to the positive side of the condenser 5 and with a pool type cathode 22, preferably of mercury, connected to the left end of the primary winding 4. The tube is also provided with an igniter 23, preferably of the type as explained above. This igniter is adapted to be supplied with igniting impulses from the secondary winding 24 of an ignition transformer 25 having a primary winding 26 adapted to be supplied with current impulses from the discharge of a condenser 27. Condenser 27 is adapted to be charged to a predetermined voltage through a suitable source of direct current, such as a battery 28, in series with the current-limiting resistance 29. Interposed between the condenser 27 and the primary winding 26 is a pushbutton switch 30 which when connected enables the condenser 27 to discharge through the primary winding 26 to supply a pulse of igniting current thereto. The primary winding 26 preferably has a resistance 31 connected across it. In order to assist the tube 19 in starting, upon an igniting impulse being supplied to the igniter 23, a resistance 32 in series with a condenser 33 is connected across that tube.

In order to cause the decay of welding current in the load 1 to be substantially exponential, as described and claimed in my copending application, Serial No. 309,124, a tube 34, also preferably of the same type as tube 19, is connected across the primary winding 4. For this purpose the tube 34 is provided with an anode 35 connected to the right end of the primary winding 4, and with a pool type cathode 36 connected to the left end of said primary winding. The tube 43 is likewise provided with an igniter 37, preferably of the same type as described for igniter 23. The igniter 37 is adapted to be supplied with igniting impulses from the secondary winding 38 of an ignition transformer 39 having a primary winding 40. Said primary winding is connected across a resistance 41 which is connected in series with a rectifier tube 42 across the condenser 5. The rectifier tube 42 may be of small current-carrying capacity, but preferably is one which can satisfactorily withstand the negative voltage applied to the condenser 5. The rectifier tube 42 is provided with a permanently-energized cathode 43 connected to the positive side of the condenser 5, and also with an anode 44 connected through the resistance 41 to the negative side of said condenser. Cathode 43 is of the permanently-energized type, and may conveniently be a thermionic filament. Due to the polarity of the connections as described above, the tube 42 ordinarily does not conduct current when the condenser 5 is charged to the polarities as indicated, by the D. C. source.

When the system is energized and the alternating voltage applied to the transformer winding 10, the tubes 6—6 start to conduct current and supply charging current to the condenser 5. With no control such as afforded by the control grids 15—15 provided, the voltage supplied to the primary winding 10 and the ratio of transformation would have to be selected so that the peak alternating voltage supplied to the rectifiers 6 would be substantially equal to the final D. C. voltage to which the condenser 5 is to be charged. Since the voltage which is built up on the condenser 5 opposes the voltage appearing across the secondary winding 8 and since the voltage on the condenser 5 is low at the beginning of the charging period, said condenser 5 charges at a maximum rate initially. However, as the voltage on the condenser 5 builds up, the difference between its voltage and the peak values of the voltage appearing across the secondary winding 8 becomes smaller and smaller so that the tubes 6 only conduct current during the peak values of the voltage impressed thereon. This means that as condenser 5 charges up, the period of conduction of the tubes 6 becomes less and less, and the increments of charging current supplied to the condenser 5 become smaller. Thus the rate of charging of the condenser 5 becomes progressively lower, and a relatively long time is needed to reach the desired voltage to which the condenser 5 is to be charged. In accordance with my invention, however, I so select constants of the system that the peak value of the alternating voltage supplied by the secondary winding 8 to the rectifying system is always substantially greater than the voltage to which the condenser 5 is to be charged. Therefore there is always a substantial difference between this peak voltage and the voltage to which the condenser 5 is charged. In this way each pulse of current supplied to the condenser 5 during the conduction of either of the tubes 6 is a substantial pulse which gives a substantial increment of charge to the condenser. Therefore the rate of charging of the condenser 5 can be made as rapid as is desired.

In order to discontinue the supply of current to the condenser 5 when a predetermined voltage is reached, the control grids 15 are provided in the tubes 6—6. Initially when the voltage across the condenser 5 is low, the bias voltage of the battery 18 holds the grids 15 positive so that the tubes 6 each start conducting current whenever their associated anodes become positive. As the voltage across the condenser 5 builds up, the tap 45 becomes negative with respect to the cathodes 11. This negative voltage opposes the positive bias supplied by the battery 18 until finally it overcomes the positive bias and the grids 15 become negative with respect to their associated cathodes. Thereupon the tubes 6 stop conducting current, and charging current to the condenser 5 ceases. By adjusting the position of the tap 45, any desired charging voltage for the condenser 5 may be selected. In this way an adjustment of the amount of energy which the condenser 5 will supply to the welding load is afforded.

Figure 2:
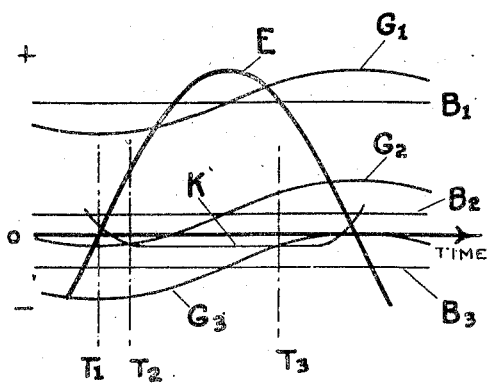
Fig. 2 is a set of curves illustrating certain aspects of the operation of my invention.

If only the voltage of the battery 18 and the tap 45 were impressed upon the grids 15, the charge on the condenser 5 would increase by substantial increments during each period of conduction of each tube 6 even during the final charge of said condenser. The greater the speed of charging of the condenser 5, the greater will be these increments. In absence of additional control factors, no adjustment within such increments could be made of the final voltage to which the condenser 5 is charged. Either the condenser would be charged to the voltage preceding such an increment or to the voltage immediately following such an increment. In order to provide for a finer control of the voltage on the condenser 5, the phase-shift circuit illustrated in Fig. 1 is connected across the impedance 16. The operation of this phase-shift circuit may be better understood by referring to Fig. 2. In this figure, E represents the voltage across one of the tubes 6; K represents the value of grid voltage above which the control grid 15 will permit the tube to fire; and B1, B2 and B3 represent three different values of resultant bias voltage on the grid 15 supplied from the battery 18 and from the tap 45. By superimposing a phase-shifted voltage from the phase shift circuit 47, 48, 49 upon B1, B2 and B3, the resultant grid voltages G1, G2 and G3 are obtained. As shown in Fig. 2, these voltages are displaced substantially 90 degrees with respect to the voltage E, although other values of phase shift could be used. With a bias voltage of B1, the associated grid voltage G1 is always above the curve K so that the tube conducts throughout the positive portion of the voltage E from the time T1 on. This represents the condition during the initial charging period of the condenser 5. It will be seen that the addition of the phase-shifted alternating voltage does not interfere with the charging of the condenser, and does not decrease the value of each charging pulse of current during this initial period. However, as the voltage on the condenser 5 approaches the desired value, a bias voltage such as B2 is reached with an associated grid voltage of G2. Under these conditions the grid voltage intersects the curve K at a somewhat later time T2, preventing the tube from starting conduction of current until such time. This causes a decrease in the size of the charging increment supplied to the condenser 5. As the charge of the condenser 5 increases during this latter period, the bias voltage drops to a value such as B3 with an associated grid voltage, such as G3. Under these conditions the grid voltage intersects the curve K at a much later time T3. This gives only a short time of conduction for the associated tube, and thus a relatively small increment of charging current. By decreasing the increments of charging current during the final charging of the condenser 5, a fine adjustment of the voltage to which the condenser 5 is to be charged can be obtained. Since, however, these decreased charging increments do not appear until the final charging of the condenser, the operation is such that the charge on the condenser 5 rapidly increases until approximately the final charge is reached, and then the final value of condenser voltage is approached in relatively small charging increments. Thus the system described operates to charge the condenser 5 rapidly, and at the same time affords a fine adjustment of the voltage to which the condenser 5 is finally charged. If no A. C. voltage were superimposed on the grids at a bias voltage of B2, conduction would occur throughout the entire time that the voltage E was positive, whereas at a bias voltage of B3, no conduction would take place. Thus in absence of the superimposed alternating current, the fine adjustment described above could not be obtained.

After the condenser 5 has been charged to a predetermined voltage as described above, the pushbutton 30 is closed, causing the previously charged condenser 27 to discharge through the primary winding 26, thus supplying an igniting impulse to the igniter 23. This causes the tube 19 to fire which closes the discharge circuit for the condenser 5 through the primary winding 4. The condenser 5 thereupon supplies a pulse of discharge current through said primary winding to the welding load 1. As the condenser 5 discharges, its voltage drops to zero. The impedance 14 is of such a value as to permit this to occur. When the voltage across the condenser 5 has fallen to zero, substantially a maximum of discharge current is flowing from said condenser. Thereupon the voltage across the condenser 5 tends to reverse, and the current tends to continue to flow in the same direction, due to the inductance of the various parts of the system to which said condenser is connected. As the voltage across the condenser 5 reverses, the tube 42 will start to conduct current, and the short pulse of current will flow through the resistance 41, setting up a voltage which is supplied to the primary winding 40. This causes an igniting impulse to be supplied through the secondary winding 38 to the igniter 37. Thereupon the tube 34 becomes ignited and the current instead of flowing through the condenser 5 flows through the tube 34. This extinguishes the discharge in the tube 19, thus effectively disconnecting the condenser 5 from the discharge circuit. As described and claimed in my copending application, Serial No. 309,124, the discharge through the tube 34 causes the current in the welding load to be substantially unidirectional with an exponential decay thereof.

When the tube 19 is extinguished and the condenser 5 thus effectively disconnected from the discharge circuit, the tubes 6 immediately start to supply full charging current to the condenser 5 inasmuch as the negative voltage between the tap 45 and the cathodes 11 has disappeared, due to the discharge of the condenser 5. As a matter of fact, due to the slight reversal of the charge on the condenser 5 which occurs during the conduction of the tube 42, the tap 45 is slightly positive, and thus adds to the positive bias of the battery 18. It will be seen, therefore, that the recharging of the condenser 5 starts even while the exponential decay of welding current is still flowing in the load 1. From the foregoing it will be seen that the system can be operated at such a speed that the condenser 5 is always being supplied with charging current except during the initial discharge of said current into the welding load. In this way a very high speed of welding operations can be secured.

Of course it is to be understood that this invention is not limited to the particular details as described above, as many equivalents will suggest themselves to those skilled in the art. For example, a condenser such as 5 could be utilized in various types of welding arrangements whether the discharge therefrom is unidirectional or not, and my novel scheme for charging said condenser as described herein could be utilized in such arrangements. Instead of the rectifying system for supplying direct current to the condenser 5 as shown, other direct current sources such as a multiphase rectifying system could be used. Also various other types of tubes and controls could be utilized to accomplish the various functions as described above. Other modifications and ideas as to the utilization of the principles enunciated herein will suggest themselves to those skilled in the art.

What is claimed is:

1. A system comprising condenser means to be charged to a predetermined voltage for storing electrical energy, a source of direct current for charging said condenser, said source comprising a rectifying space discharge tube having a control electrode, the voltage of which controls the starting of a discharge through said tube for each alternating current cycle, means for causing the voltage on said control electrode to vary in accordance with the voltage on said condenser means to stop conduction through said tube when said voltage has risen to a predetermined value, the voltage of said source being substantially greater than said predetermined voltage, whereby a substantial increment of charge is supplied to said condenser for each cycle of said alternating current source, means for impressing on said electrode voltage an alternating voltage displaced in phase from the voltage of said alternating current source, whereby the size of said increments as the voltage on said condenser approaches said predetermined value is decreased, a load circuit, and means for discharging said condenser to supply a pulse of current to said load circuit.

2. A system comprising condenser means for storing electrical energy, a source of direct current connected to said condenser for charging said condenser, a load circuit, means for discharging said condenser to supply a pulse of current to said load circuit, the constants of the discharge circuit thus established being of such values as to cause the voltage on said condenser to reverse during the discharge, and means responsive to reversal of voltage on said condenser for disconnecting said condenser from its discharge circuit and causing the load current to decay over an appreciable period, and means for causing said direct current source to start to recharge said condenser during said decay period.

3. A system comprising condenser means for storing electrical energy, a source of direct current connected to said condenser for charging said condenser, impedance means in the charging circuit of said condenser for determining the rate of charging, a load circuit, means for discharging said condenser to supply a pulse of current to said load circuit, the constants of the discharge circuit thus established being of such values as to cause the voltage on said condenser to reverse during the discharge, and means responsive to reversal of voltage on said condenser for disconnecting said condenser from its discharge circuit and causing the load current to decay over an appreciable period, and means for causing said direct current source to start to recharge said condenser during said decay period.

4. A system comprising condenser means for storing electrical energy, a source of direct current connected to said condenser for charging said condenser, a load circuit, controlled rectifying means for connecting said condenser means to said load circuit to discharge said condenser into said load circuit, the constants of the discharge circuit thus established being of such values as to cause the voltage on said condenser to reverse during the discharge, and means responsive to reversal of voltage on said condenser for establishing a shunt circuit across said load circuit in which the load current can decay, whereby said reversed voltage extinguishes said rectifying means, and means for causing said direct current source to start to recharge said condenser during said decay period.

5. A system comprising condenser means to be charged to a predetermined voltage for storing electrical energy, a source of direct current for charging said condenser, said source comprising a rectifying space discharge tube having a control electrode, the voltage of which controls the starting of a discharge through said tube for each alternating current cycle, means for causing the voltage on said control electrode to vary in accordance with the voltage on said condenser means to stop conduction through said tube when said voltage has risen to a predetermined value, the voltage of said source being substantially greater than said predetermined voltage, whereby a substantial increment of charge is supplied to said condenser for each cycle of said alternating current source, and means for impressing on said electrode voltage an alternating voltage displaced in phase from the voltage of said alternating current source, whereby the size of said increments as the voltage on said condenser approaches said predetermined value is decreased.

6. A system comprising condenser means for storing electrical energy, a load circuit, means including a circuit-closing means for discharging the energy of said condenser into said load circuit, a source of direct current for charging said condenser, said source comprising rectifying means adapted to be energized from a source of alternating current, a fixed reference voltage source, means for deriving a portion of the voltage appearing across said condenser, and means responsive to the difference between said reference voltage and said portion of the condenser voltage for stopping conduction through said rectifying means when said difference becomes substantially zero.

7. In combination, an alternating current supply circuit, a load circuit, a capacitance, means for charging said capacitance from said supply circuit and comprising a rectifier having a grid, a control circuit connected to said grid for controlling the current conducted by said rectifier, control means responsive to the voltage of said capacitance for impressing a negative hold-off voltage on said grid when the voltage of said capacitance attains a predetermined value, means for discharging said capacitance to effect energization of said load circuit, said control means being responsive to the voltage of said capacitance during discharge for removing said hold-off potential.

8. In combination, an alternating current supply circuit, a load circuit, a capacitance, means for charging said capacitance from said supply circuit and comprising a rectifier having a grid, a control circuit connected to said grid for controlling the current conducted by said rectifier, control means responsive to the voltage of said capacitance for impressing a negative hold-off voltage on said grid when the voltage of said capacitance attains a predetermined value, means for discharging said capacitance to effect energization of said load circuit, said control means being responsive to the voltage of said capacitance during discharge for removing the hold-off voltage and for permitting subsequent charge of said capacitance by said rectifier.

9. In combination, a supply circuit, a load circuit, a capacitance, means for charging said capacitance from said supply circuit, control means responsive to the voltage of said capacitance for preventing operation of the charging means when the voltage of said capacitance attains a predetermined value, means for discharging said capacitance to effect energization of said load circuit, said control means being responsive to the voltage of said capacitance during discharge for controlling the charging means to recharge said capacitance.

10. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, control means connected to said valve means for rendering said valve means conductive at substantially the same instant early in each positive pulsation of said source, and means associated with said control means and responsive to the potential charge on said capacitor for causing said control means to render said valve means conductive at an instant gradually later in each succeeding positive pulsation as said capacitor potential increases above a preselected magnitude.

11. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means responsive to the potential charge on said capacitor for impressing in said control circuit a potential which first rises above said critical value at substantially the same instant early in each positive pulsation while the capacitor potential is below a preselected magnitude and at an instant gradually later in each succeeding positive pulsation as the capacitor potential increases above said preselected magnitude.

12. For use in charging a capacitor to a potential of a preselected magnitude from a source of periodically pulsating potential in circuit therewith, the combination comprising electric discharge valve means of the arc-like type interposed in circuit between said source and capacitor for controlling the supply of charging current to said capacitor, a control circuit connected to said valve means and arranged to render said valve means conductive when a potential greater than a predetermined critical value is impressed therein in a positive pulsation of said source, and means responsive to the potential charge on said capacitor and adapted to impress in said control circuit a potential which first rises above said critical value at substantially the same instant early in each positive pulsation while the capacitor potential is below a second preselected magnitude less than said first preselected magnitude and at an instant gradually later in each succeeding positive pulsation as the capacitor potential increases from said second preselected magnitude to said first preselected magnitude and which does not rise above said critical value when said capacitor potential is at said first preselected magnitude.

13. In an electrical control system for controlling the delivery of energy between a source of current and an energy storage device, the combination of current flow control means interposed between said source and said device, and control means for said first-mentioned means including means to vary the rate at which said first-mentioned means is effective to deliver said energy to said device, said control means including means for producing a pair of differentially related control voltages one whereof is continuously proportional to the charge on said device, and means rendering said first-mentioned means operably responsive to the difference between said voltages.

14. In an electrical control system for controlling the delivery of energy between a source of current and an energy storage device, the combination of current flow control means interposed between said source and said device, and control means for said first-mentioned means including means to progressively decrease the rate at which said first-mentioned means is effective to deliver said energy to said device, said control means including means for producing a pair of differentially related control voltages one whereof is continuously proportional to the charge on said device, and means rendering said first-mentioned means operably responsive to the difference between said voltages.

15. In an electrical control system for controlling the delivery of energy between a source of pulsating current and an energy storage device, the combination of current flow control means interposed between said source and said device for passing successive half cycles from said source to said device, and control means for said first-mentioned means including means to vary the fractions of successive said pulsations which said first-mentioned means is effective to pass to said device, said control means including means for producing a pair of differentially related control voltages one whereof is continuously proportional to the charge on said device, and means rendering said first-mentioned means operably responsive to the difference between said voltages.

16. In an electrical control system for controlling the delivery of energy between a source of pulsating current and an energy storage device, the combination with said energy storage device of electric valve means for controlling the delivery to the device of successive pulsations of the source, and control means for said valve means including means to progressively decrease the fractions of successive said pulsations which are delivered to said device, said control means including means for producing a pair of differentially related control voltages one whereof is continuously proportional to the charge on said device, and means rendering said first-mentioned means operably responsive to the difference between said voltages.

17. In an electrical control system for controlling the delivery of energy between a source of pulsating current and an energy storage device, the combination of current flow control means interposed between said source and said device for passing successive half cycles from said source to said device, and control means for said first-mentioned means including means to progressively decrease the fractions of successive said pulsations which said first-mentioned means is effective to pass to said device, said control means including means for producing a pair of differentially related control voltages one whereof is continuously proportional to the charge on said device, and means rendering said first-mentioned means operably responsive to the difference between said voltages.

JOHN W. DAWSON.

REFERENCES CITED

The following references are of record in the file of this patent:

UNITED STATES PATENTS

| Number | Name | Date |
|---|---|---|
| 1,168,346 | Thomson | Jan. 18, 1916 |
| 2,036,719 | Prinz et al. | Apr. 7, 1936 |
| 2,102,951 | Hackenberg | Dec. 21, 1937 |
| 2,113,220 | Power | Apr. 5, 1938 |
| 2,147,472 | Ulrey | Feb. 14, 1939 |
| 2,179,105 | Sidney | Nov. 7, 1939 |
| 2,179,791 | Kock | Nov. 14, 1939 |
| 2,221,569 | Berkey et al. | Nov. 12, 1940 |
| 2,235,385 | Rava | Mar. 18, 1941 |
| 2,315,093 | Languepin | Mar. 30, 1943 |

OTHER REFERENCES

"Welding Journal," August 1935, pages 6–8.